United States Patent Office 3,823,129
Patented July 9, 1974

3,823,129
GLUTARALDEHYDE INSOLUBILIZED CONCANAVALIN A IN CRYSTALLINE FORM
Aaron Joseph Kalb and Joseph Yariv, Rehovot, Israel, assignors to Yeda Research and Development Co. Ltd., Rehovot, Israel
No Drawing. Filed Aug. 17, 1971, Ser. No. 172,559
Claims priority, application Israel, Aug. 26, 1970, 35,169/70
Int. Cl. A23j 1/14
U.S. Cl. 260—123.5
1 Claim

ABSTRACT OF THE DISCLOSURE

The present invention relates to insolubilized crystalline concanavalin A, to a process for preparing same by reacting crystalline concanavalin A with a cross-linking agent, and to a process for the selective removal of transition metals from solutions containing also other cations, and to a process for the selective removal and recovery of saccharides from solutions of same.

BACKGROUND OF THE INVENTION

Field of the Invention

The present invention relates to a novel composition of matter, namely insolubilized crystalline concanavalin A, to a process for preparing same by reacting crystalline concanavalin A with a bifunctional or polyfunctional cross-linking agent and to a process for the selective removal of transition metals from solutions thereof together with other cations and also to a process for the removal of saccharides from solutions of same.

Description of the Prior Art

Concanavalin A is a protein contained in Jack beans which are grown in subequatorial Africa and in Japan and which are used as fodder. Jack beans contain 1 to 3 percent by weight of concanavalin A and this protein can be easily obtained from the Jack beans in crystalline form. It is known that solutions of concanavalin A bind certain transition metals, calcium and also saccharides. The crystals of concanavalin obtained by the conventional methods vary in size from microscopic size of several millimeters, and depends to a certain extent on the method of preparation. The thus obtained crystals are soluble in the usual solvents for proteins. The use of concanavalin A, in the soluble form, for the removal of transition metals and for the removal of saccharides is not convenient and quite cumbersome.

SUMMARY OF THE PRESENT INVENTION

According to the present invention there is provided as a novel composition of matter, crystalline insolubilized concanavalin A and a process for preparing same. Furthermore, there is provided a novel process for the removal of transition metal ions from solutions of same together with other cations. There is also provided a novel process for the removal of saccharides from solutions of same.

Concanavalin A is a protein contained in Jack beans. These are grown in subequatorial Africa and in Japan and used as fodder. Jack beans contain about 1 to 3 percent by weight concanavalin A. This protein can be easily and inexpensively obtained from this source in crystalline form. Solutions of concanavalin A and also the crystalline protein bind certain transition metals, calcium and saccharides at specific sites.

The crystals of concanavalin A obtained by the conventional methods vary in size from microscopic to a size of several millimeters. The size depends on the conditions of preparation.

According to the present invention there is provided a novel process for the insolubilization of concanavalin A, resulting in a crystalline product which is insoluble even in very good solvents for proteins, which is acid-resistant and which is characterized by improved mechanical properties as compared with the starting material. The binding of transition metals, of calcium and, of saccharides at the effective sites is not impaired and the insolubilized crystalline product can be repeatedly used for the recovery of transition metals, and of saccharides.

The process of insolubilizing crystalline concanavalin A comprises reacting crystalline concanavalin A with a suitable bifunctional or polyfunctional agent adapted to penetrate the crystal and to bring about a cross-linking of adjacent protein molecules. The cross-linking agent is advantageously used in the form of an aqueous solution of same. A suitable cross-linking agent is, for example, glutaraldehyde. Other suitable bi- or poly-functional cross-linking agents may be used as well.

Protein crystals contain generally a large proportion of water, most of which is not bound to the protein. This applies also to crystalline concanavalin A obtained, for example, from Jack beans. Dut to this, solutions of suitable cross-linking agents easily permeate the crystals and bring about the desired internal cross-linking.

Concanavalin A is obtained in various crystal forms, depending on the pH and on the concentration of electrolytes from which it is crystallized. The cross-linking according to the present invention does not change the crystalline form of the treated crystals of concanavalin A; only the solubility and mechanical strength of the crystals are drastically modified. Whereas the original crystals are soluble in conventional solvents for proteins and highly fragile, the cross-linked product is insoluble in such solvents and is characterized by a substantially increased mechanical strength. Due to its crystalline nature, the product contains a high density of binding sites. It can be repeatedly used for the selective removal of traces of transition metals from solutions of same together with other cations and also for the removal of saccharides. It can be used for the recovery and isolation of rare or precious elements and compounds, making possible the recovery of such compounds and elements from sources which have been hitherto neglected due to the lack of suitable processes of separation.

The crystalline cross-linked product can be treated with dilute acid (such as 0.1 M HCl), resulting in a removal of the bound metal. The demetallized crystals have a high affinity for the above defined metal ions and these are selectively recovered from solutions of same. The selective removal of transition metal ions is not impaired by the presence of monovalent and bivalent ions such as sodium, potassium and magnesium. The insolubilized crystalline substance can be used repeatedly for the binding and release of transition metals. Amongst metal ions bound and released there may be mentioned cobalt, manganese and cadmium. The lowest tested concentrations at which these ions were effectively removed from solutions was about 1 p.p.m.

When the binding sites specific for the transition metal and for calcium are occupied, the insolubilized concanavalin A binds a variety of saccharides, these being also the property of the native concanavalin A.

In the following the preparation of insolubilized crystalline concanavalin A is illustrated by way of example and it ought to be clearly understood that various changes and modifications in the nature of the polyfunctional agent, and the conditions of reaction may be resorted to without departing from the scope of the invention.

EXAMPLE

Concanavalin A crystals were prepared by dialyzing a solution of the native protein in saturated sodium chloride solution (protein concentration 10–40 mg./ml.) against a saturated sodium sulfate solution buffered with phosphate (0.05 M at pH 7.0). The crystals were stirred with aqueous 1 percent glutaraldehyde during 1 hour, washed with distilled water to remove the salt, resulting in a crop of about 90 percent of insolubilized crystalline concanavalin A.

The thus obtained crystals were demetallized by a treatment during 10 minutes with 10–50 volumes of 0.1 N HCl and washed with distilled water till free of acid. The thus obtained product was tested as to its ability to bind transition metals from solutions of same together with other cations. Concentrations as low as 1 p.p.m. of metals such as cobalt, manganese and cadmium were quantitatively removed. The equivalent weight of protein for binding one gram-atom of transition metal is 30,000 g.

The bound metal was released by treating the crystals with 0.1 N HCl and again washed with water.

The insolubilized crystals were also treated as to their ability to bind various saccharides. Using a C–14 labelled glucose it was shown that the insoluble product contains binding sites for saccharides, similar to those of native concanavalin A. Dextran (average M.W.=5000) and glycoproteins such as modified RNAse B present in commercial preparations of RNAse A were bound by the crystalline insolubilized concanavalin A from dilute solutions of same.

The polysaccharide can be removed from the concanavalin A by contacting the cross-linked concanavalin A with a solution of a monosaccharide. The latter can be removed from the concanavalin A by washing with buffer or with water.

After removal of the monosaccharide, the insolubilized concanavalin A can be used again for the binding of polysaccharide. It is pointed out that the polysaccharide is bound to insolubilized concanavalin A which has bound to it calcium ions and cations of at least one transition metal, such as manganese, nickel, cobalt, zinc or the like.

We claim:
1. Crystalline concanavalin A insolubilized by glutaraldehyde.

References Cited

Biochemical Journal, Vol. 118, No. 4, July 1970, pp. 679–680, Donnelly et al.

Chem. Abstracts, Vol. 19, 1925, Sumner et al., 2677–2678.

Chem. Abstracts, Vol. 30, 1936, Sumner et al., 4183[9]–4184[1].

Chem. Abstracts, Vol. 30, 1936, Sumner et al., 7596[6–9].

J. of Biological Chemistry, 115, 1936, pp. 583–588, Sumner et al.

HOWARD E. SCHAIN, Primary Examiner

U.S. Cl. X.R.

23—312 Me; 260—209 R, 209 D